May 15, 1962  B. H. GROSE ET AL  3,035,248
REMOTE CONTROL SYSTEMS
Filed Jan. 23, 1958  8 Sheets-Sheet 4

*INVENTORS.*
*Basil Hubert Grose and*
*Stanley Leonard Hurst*
BY
W. L. Stout
*THEIR ATTORNEY*

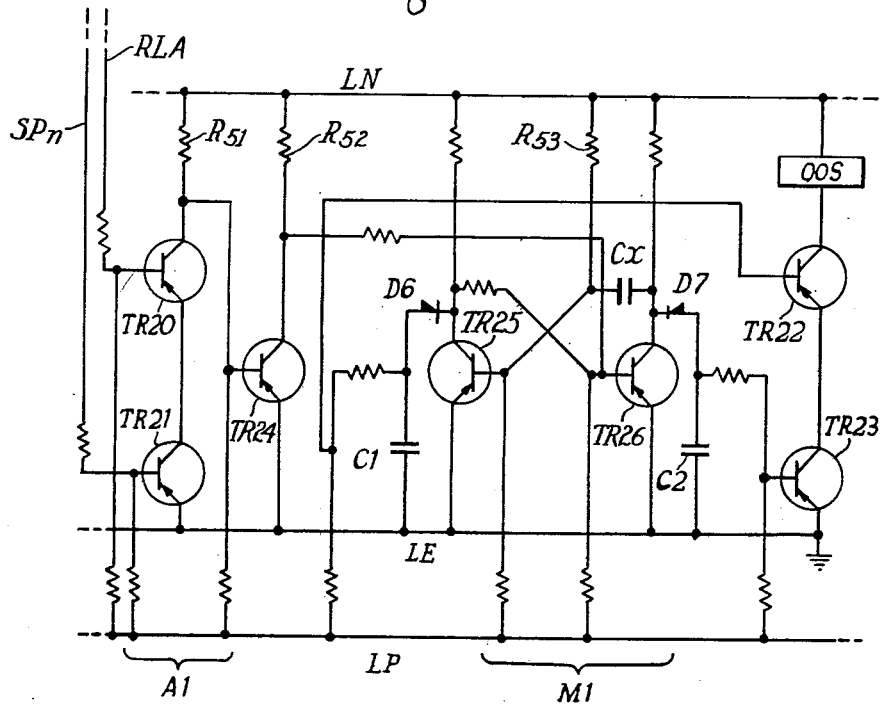

United States Patent Office 3,035,248
Patented May 15, 1962

3,035,248
REMOTE CONTROL SYSTEMS
Basil Hubert Grose and Stanley Leonard Hurst, London, England, assignors to Westinghouse Brake and Signal Company, Limited, London, England
Filed Jan. 23, 1958, Ser. No. 710,718
Claims priority, application Great Britain Jan. 25, 1957
10 Claims. (Cl. 340—163)

This invention relates to remote control systems and is primarily intended for the control of apparatus governing the movement of railway traffic at one or more outlying areas from a control office remote from said outlying areas. Each area may contain a number of switches and signals controlled from the control office either individually or in groups to provide for the movement of vehicles either by setting up complete routes or by the operation of individual switches and signals. The system also provides for the return from the outlying area to the control office of information regarding track occupancy, the position of switches and signals and such other information as may be required to facilitate handling of the traffic.

Systems known and in use provide these facilities by code transmissions sent and received by relays connected to two or more line wires connecting the control office and the outlying areas.

It is an object of our invention to provide a continuously operating remote control system which remotely controls from a control office a number of functions located at outlying areas and registers indications of the conditions of these functions at the control office.

Another object of our invention is a remote control system which continuously scans a series of functions located at a remote area to control the condition of these functions and to register an indication of those conditions at the central location from which the controls originate.

A further object of our invention is a continuously operating remote control system which scans a series of remotely located functions in rapidly recurring cycles to provide control and indication of each function, from a central office, which is substantially the equivalent of a direct connection with each function.

It is also as object of our invention to provide an electronic, continuously operating remote control system whose elements have long operating lives.

Still another object of our invention is a transistorized remote control system which continuously scans in recurring cycles a series of controllable functions remotely located to provide control of and indication from each function at a central office during each scanning cycle.

Other objects, features, and advantages of our invention will become apparent from the following specification when taken in connection with the accompanying drawings.

In a remote control system, according to the present invention, the scanning in sequence of the positions of control devices at the control office is continuous and proceeds simultaneously and in step with the scanning of the positions of the apparatus at the outlying areas controlled by those devices. Further, the invention provides that the return of information is accomplished similarly by arranging that indicating elements situated at the control office and indicative of the positions of the apparatus are scanned in step with the continuous scanning of the positions of the apparatus.

More particularly, according to the present invention, a remote control system for controlling from, and indicating at, a control office the positions or states of apparatus at outlying areas comprises in part, manually operable two position control devices provided at the control office for each item of apparatus whose position or state is controllable therefrom and two-position indicating elements provided at the outlying area for each item of apparatus whose position or state is to be indicated at the control office, the indicating elements being representative according to their positions of the positions or states of the respective items of apparatus. Further, two-state functional elements are provided at the outlying area for each of the control devices, arranged to determine automatically according to their states the positions of the respective items of apparatus. Similarly, two-state indicating elements are provided at the control office for each of the two position indicating elements. The system also includes means to carry out continuously the scanning in sequence of the positions of the control devices simultaneously and in step with the scanning of the positions of the two position indicating elements and means by which a line circuit extending between the control office and the outlying area is conditioned, as each of the control devices and two-position indicating elements is scanned, in a manner characteristic of their prevailing positions. The two-state functional and indicating elements are arranged to be responsive in turn to the condition of the line circuit such that conformity is maintained, on the one hand, between the states of the functional elements and the positions of their respective control devices, and, on the other hand, between the states of the indication elements at the control office and the positions of their respective indicating elements at the outlying area. Although it is possible, and within the scope of the invention, for more than one functional element to be scanned in any one step, provided, of course, that the appertaining items of apparatus are never required to assume differing positions, the equivalent effect may be more simply obtained using conventional methods for the multiplication of orders, for example, multi-contact relays. The same is the case for the two-position indicating elements at the outlying area and the two-state indicating elements at the control office.

Carrier frequencies are used to condition the line circuit and although the absence of such a frequency may be utilized as a characteristic condition so that only two frequencies are needed, one for each direction of transmission, it is preferred that two carrier frequencies are available in each direction to set up the characteristic conditions of the line circuit. Thus, each order from the control office and each indication from the outlying area is given by the transmission of a pulse of one of two different carrier frequencies.

The step by step scanning conveniently proceeds under the control of a counting chain which comprises a number of consecutively acting similar stages, it being preferred that the provision of such a chain is made both at the control office and the outlying area. Such a counting chain may be composed of bi-stable circuits, of which only one could suffice for each stage. However, there are preferably a plurality of bi-stable circuits in each stage so that advantage may be taken of the successive reversal of their conditions in the course of each counting step to displace in time the various operations which are to be initiated by each stage.

In order that, as soon as a scanning cycle has been completed, a fresh cycle commences, the last stage of the counting chain may be employed to reset the chain automatically in readiness for the fresh cycle.

By way of example, there will now be described, by reference to its salient operating features, one particular form of remote control system in accordance with the invention. This particular system is applicable to apparatus governing, or indicative of, the movement of railway traffic such, for example, as switches, signals, and track circuits. In describing the system, reference is made to the accompanying drawings, in which:

FIG. 10 is a circuit diagram of a circuit for checking that scanning at the control office and the outlying area is synchronised.

Figure 1:
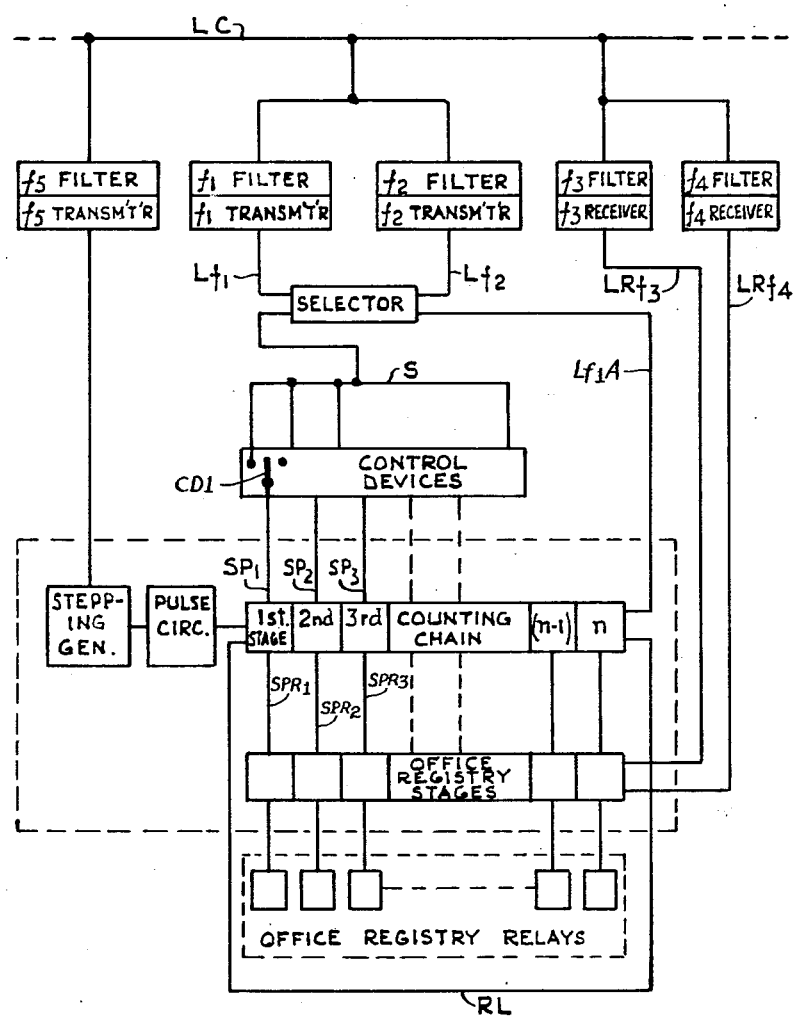
FIGS. 1 and 1a show respectively, as block diagrams, the portions of the system situated at the control office and the outlying area.
Figure 1A:
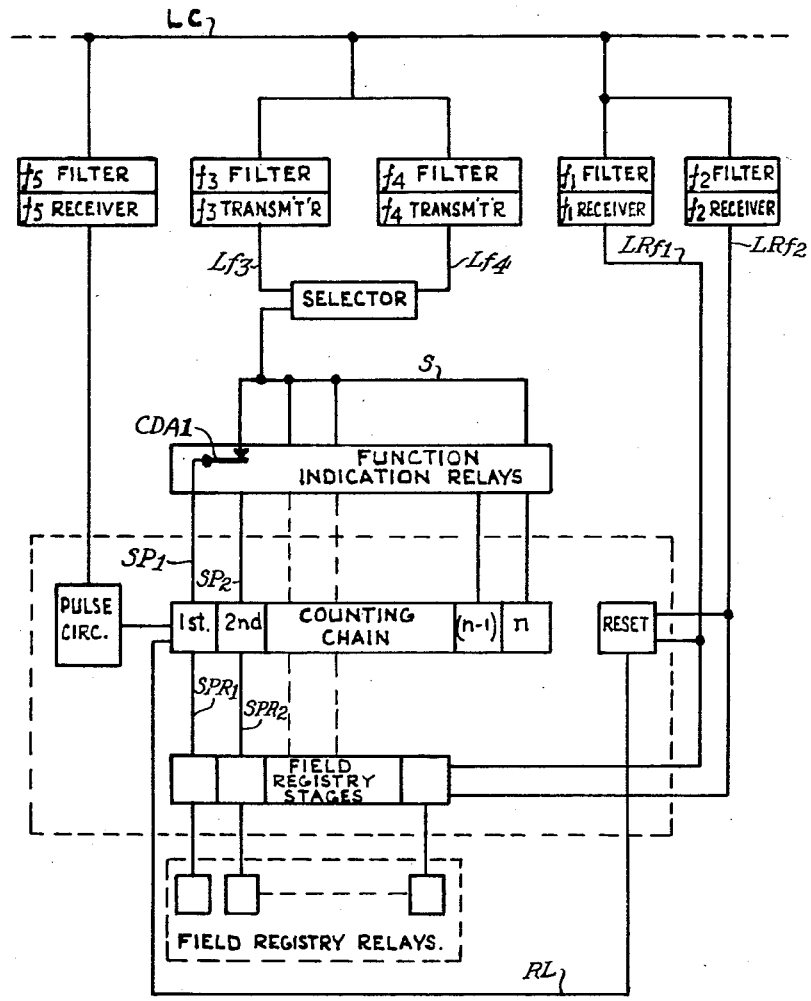

As shown in FIGS. 1 and 1a the remote control system comprises a counting chain situated at the control office (FIG. 1), which is composed of a number of identical stages equal to the number of functions to be performed in the outlying area or the number of indications informative of the positions or states of the apparatus in that area, whichever number is the greater, and a complementary counting chain situated at the outlying area composed of the same number of identical stages. The number of stages in each chain is designated $n$, and for each stage in the control office chain there is a corresponding stage in the chain at the outlying area. These counting chains are included in so-called "coding units," of which the one at the outlying area is located at a point to be referred to hereinafter as a "field location" (FIG. 1a).

Figure 2:
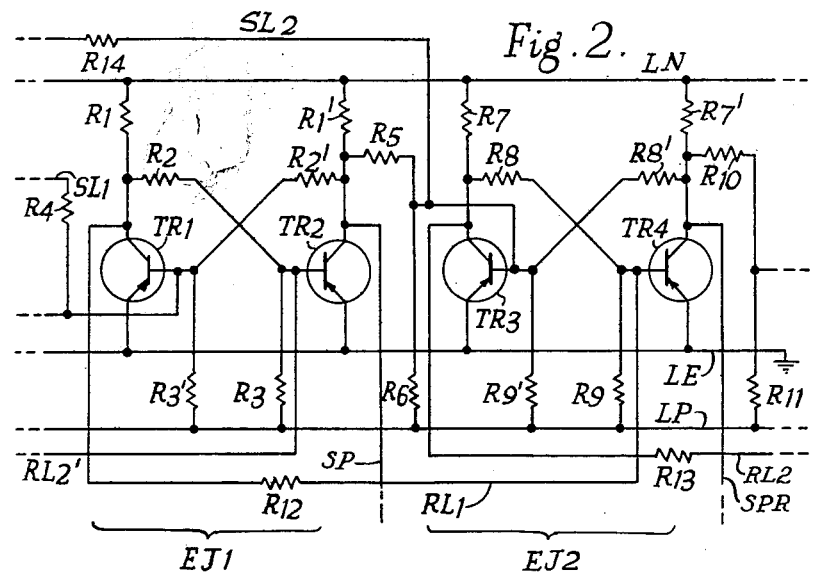
FIG. 2 is a circuit diagram of a complete counting chain stage.

Each stage of the counting chain, whether at the control office or the field location, is constituted by a pair of bi-stable circuits, for example, of the type circuit known as an Eccles-Jordan circuit, preferably employing junction-type transistors as shown in FIG. 2. The characteristic of such a circuit is that its prevailing condition is reversible by the application of a stepping pulse thereto, the circuit being stable in the reversed condition, despite the continued application of otherwise operative stepping pulses, until the circuit is reset once more to its former condition.

In the single counting stage shown in FIG. 2, the two Eccles-Jordan circuits of the pair constituting each stage are designated by EJ1 and EJ2. Each of these circuits includes two transistors, TR1, TR2 and TR3, TR4 respectively. These transistors are assumed to be of the p-n-p type and this assumption will be made for all further transistors in the system. Thus, to the extent that references are made hereinafter to the polarities of the potentials applied to the circuits, these polarities will be those appropriate for transistors of this type. Opposite polarities would be necessary if using transistors of the n-p-n type.

The four transistors of the illustrated stage are connected in cascade, their collectors to a line LN at a steady negative potential through resistors $R_1$, $R_1'$, $R_7$ and $R_7'$, respectively, their emitters directly to a line LE at ground potential, and their bases to a line LP at a steady positive potential through resistors $R_3'$, $R_3$, $R_9'$ and $R_9$, respectively.

The intermediate coupling between circuits EJ1 and EJ2 and the interstage coupling between circuits EJ2 and the circuit in the next stage corresponding to EJ1 are shown to be both the same, the collector of TR2 or TR4 being connected to the line LP through resistors $R_5$, $R_6$, or $R_{10}$, $R_{11}$, respectively, and a connection being made from the base of transistor TR3, or TR1 of the next stage, to a point between the associated resistors. Also connected with this point is a stepping pulse supply line, SL1 in the case of the interstage coupling and SL2 in the case of the intermediate coupling, these stepping pulse lines including resistors $R_4$ and $R_{14}$ respectively. The cross-over connections characteristic of the Eccles-Jordan arrangement of the transistors include resistors $R_2$ and $R_2'$ in the case of transistors TR1 and TR2, and resistors $R_8$ and $R_8'$ in the case of transistors TR3 and TR4.

By means of the couplings, the response of the Eccles-Jordan circuits to operative stepping pulses is made conditional upon the prior reversal of the immediately preceding circuit so that successively applied pulses advance the reversed condition in order down the chain from one stage to the next. The advance between stages is dependent upon the reversal of the condition of the intermediate Eccles-Jordan circuits EJ2 which in turn is dependent upon the supply of stepping pulses over the separate line SL2. Thus, this supply of pulses affords an additional control on the advance of the reversed condition, which control is superimposed on that already afforded by the pulses over the other line SL1. In the present instance, this additional control is utilized to insure a delay between reversal of the conditions of the main and intermediate circuits and thereby to insure that the priming between one circuit and the next is not so fast as to render the next circuit responsive at a time when there is still prevailing a pulse which could reverse it but which is prior to the appropriate pulse. For this purpose, the operative pulses over line SL2 alternate with those over line SL1.

Figure 3:
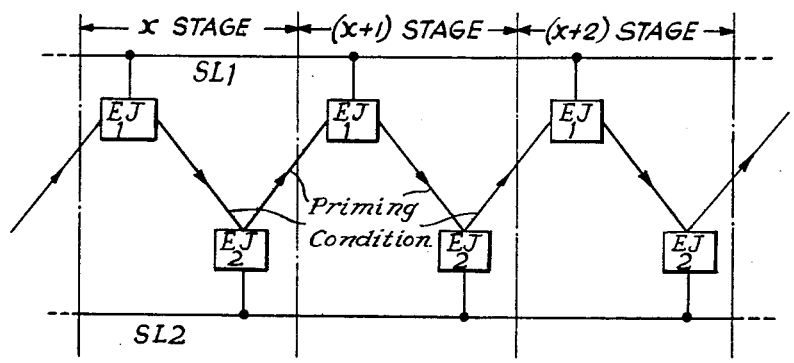
FIG. 3 shows diagrammatically the way in which component circuits of the counting chain stages are linked with two separate supplies of stepping pulses.

FIG. 3 shows schematically the connection of the main circuits EJ1 with line SL1 and the intermediate circuits EJ2 with line SL2 for a block of three complete consecutive stages, $x$, $(x+1)$, and $(x+2)$. The lines between the circuits, as noted on the drawing, indicate the sequence of transmission of the priming condition.

Describing in greater detail the action of the counting chain stages, the stepping pulses take the form of momentary interruptions of an otherwise steady positive potential. In their normal conditions, the transistors TR1 and TR3 are non-conducting and the transistors TR2 and TR4 are of necessity conducting. The feed back over the cross-over connections through resistors $R_2'$ and $R_8'$ is such that the potentials at the bases of the transistors TR1 and TR3 are maintained positive even on the interruption of the positive potential of the relevant stepping supply. Thus, a further negative potential is required at the bases of these transistors if their polarity is to be reversed from positive to negative. This further potential, which serves for priming purposes, is supplied to the base of transistor TR1 from the intermediate EJ circuit of the preceding stage but it is insufficient to overcome the combination of the feed-back and stepping supply potentials. Consequently, only when both the priming potential and an interruption representative of a stepping pulse in the stepping supply are concurrent can the base of transistor TR1 become negative. Assuming its base to have become negative in this way, transistor TR1 is caused to conduct. Transistor TR2 becomes immediately non-conducting due to the feed-back and its collector therefore approaches the full negative potential of the negative supply over line LN. As a result, the potential distribution in the resistance divider circuit composed of resistors $R_5$ and $R_6$ is altered such that the connection of this divider circuit with the base of transistor TR3 becomes negative, thereby priming it for response to the next stepping pulse over line SL2. When transistor TR3 becomes conducting, transistor TR4 of necessity becomes non-conducting and its collector approaches the full negative potential of line LN. The center or common connection of resistors $R_{10}$ and $R_{11}$ then assumes a negative potential, thereby providing a priming potential for transistor TR1 of the succeeding counting stage.

When transistor TR1 is conducting, the input impedance is very much lower than when it is non-conducting so that it cannot revert to its former condition when positive potential is restored on line SL1 after the stepping pulse. The main circuit EJ1 therefore remains in the reversed condition and the action of priming for response to the next stepping pulse is made between the one EJ circuit and the next to enable the advance of the reversed condition down the chain.

Although, as shown, two stepping supplies over separate lines are used, the alternative of using a single supply over a single line is available, if the intermediate couplings between the pair of EJ circuits of a stage are modified to delay the application of the priming potential to the intermediate circuit. For this purpose, there may be included in the intermediate coupling a capacitor which is charged exponentially towards the negative potential appearing at the collector of the transistor TR2 on reversal of the main circuit, so that the building up of the requisite priming potential at the capacitor is delayed over a brief period during which the intermediate circuit remains unresponsive to pulses of the common stepping supply.

The connection of the EJ circuits in cascade in each counting chain enables resetting of the circuits to cascade down the chain. However, this resetting action is made more rapid by the provision of resetting links RL1 and RL2 (RL2′) including respectively resistances $R_{12}$ and $R_{13}$ and connecting respectively the collector of transistor TR1 in the main circuit with the base of transistor TR4 in the intermediate circuit and the collector of transistor TR3 in the intermediate circuit with the base of transistor TR2 of the main circuit of the next stage.

At the completion of a scanning cycle, during which all the stages have acted by reversal of the conditions of their EJ circuits, an appropriate pulse from an external circuit, to be described later, is applied to the base of the transistor TR2 of the first stage to cause it to become conducting. Since, of necessity, transistor TR1 then becomes non-conducting, approximately full negative potential then appears at its collector and is applied over the link RL1 to the base of the transistor TR4 of the first stage, which transistor therefore becomes conducting once again. With transistor TR3 non-conducting and its collector at nearly full negative potential, a similar resetting action follows between circuit EJ2 and circuit EJ1 of the next stage over the link RL2 and in this way cascades rapidly down the chain until all the EJ circuits in the chain have been reset.

It is convenient at this time, to conclude the description of the counting chains, to explain the manner in which the stepping supplies are derived. They may be derived from locally available sources of alternating current at commercial frequency or alternatively they may be separately generated. The derivation or generation may be made separately at the control office and the field location so long as the pulses are accurately synchronised as between the office chain and the outlying chain in order to ensure that the action of the stages proceeds in step. To the end of obtaining such synchronism, however, it is preferred to include in the system a single stepping generator arranged to serve in common both the office chain and the outlying chain.

As shown in FIG. 1, the stepping generator is included as part of the coding unit at the control office, and from it outputs are taken, on the one hand, to a pulse circuit for the office chain and, on the other hand, to a transmitter and filter combination. This combination is in turn connected to a communication channel, illustrated as a line circuit LC, extending between the control office and the field location. At the field location, there are provided counterparts in the form of a filter and receiver combination connected between the line circuit LC and a pulse circuit for the outlying chain. The combinations referred to above are necessary since only a single line circuit is employed to serve for the transmission of other signals as will become clear later in this description. The output of the stepping generator is therefore transmitted between the control office and the field location as a distinctive carrier frequency, designated herein $f_5$, differing from all other carrier frequencies used over the line circuit.

For the stepping generator, use is made of a circuit similar to the well-known vacuum tube multi-vibrator, but preferably employing junction-type transistors in place of the tube elements.

Figure 4:
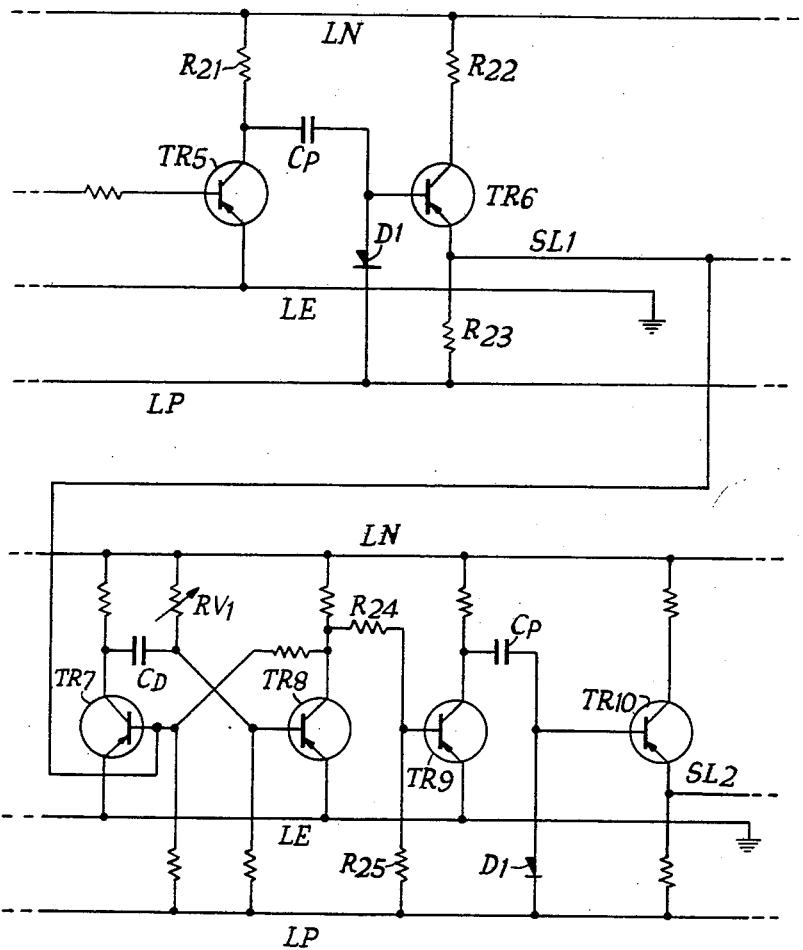
FIG. 4 is a circuit diagram of a stepping pulse circuit.

Both the pulse circuits are the same and are arranged as shown in FIG. 4. It will be recalled that first and second stepping supplies are required for each of the counting chains, the pulses over each being alternate. The pulse circuit is therefore divisible into a portion applying the first supply to the line SL1 and another portion applying the second supply to the line SL2. The first portion comprises two transistors TR5 and TR6 having their collectors connected through resistors $R_{21}$ and $R_{22}$, respectively, to negative potential line LN, and their emitters connected, respectively, to line LE at ground potential and, through a resistor $R_{23}$, to line LP at positive potential. The base of transistor TR5 is connected to receive the output of the stepping generator which has a square wave form symmetrical about the line of zero potential. The base of the transistor TR6 is connected to a tapping point intermediate a capacitor $C_P$ and a half-wave rectifier D1 through which the collector of the transistor TR5 is connected to the line LP, the rectifier being so poled as to conduct only in the direction from the capacitor to line LP.

Due to the nature of the output applied at its base, transistor TR5 is caused to be alternately conducting and non-conducting for periods of equal duration, and consequently the potential of its collector alternates between ground and a value approaching the full negative potential of the line LN. The positive pulse which is produced by the capacitor $C_P$ when ground potential prevails is shunted to the line LP through the rectifier D1, and the normally non-conducting state of the transistor TR6 is unaffected. Even for the most part of the period when approximately full negative potential prevails at the collector of TR5, the normal state of the transistor TR6 is unaffected. In this normal state, the transistor TR6 has at its emitter a value of positive potential approaching that of the line LP to provide the normal positive potential over the line SL1.

However, the negative pulse produced by the capacitor $C_P$ over a brief initial portion of the period when approximately full negative potential prevails at the collector of TR5 is impressed on the base of transistor TR6 and is of a sufficient amplitude to cause this transistor to become conducting, whereby the potential at the emitter, and hence over the line SL1, falls momentarily, the extent of the drop being determined by the resistance divider circuit $R_{22}$ and $R_{23}$. The values of these resistors are so interrelated that the drop is approximately to zero potential. Thus the stepping pulse introduced into the line SL1 for each cycle of the stepping generator output takes the form of a momentary interruption of an otherwise steady positive potential.

The function of the second portion of the pulse circuit is to displace in time, i.e., delay, the pulses introduced into the line SL2. This second portion comprises a mono-stable circuit having transistors TR7 and TR8 which circuit is coupled with a further circuit identical with the first portion, the transistors in this latter circuit being designated TR9 and TR10. The mono-stable circuit is of a known kind, often referred to as a "flip-flop" circuit, and includes a capacitor $C_D$ and a variable resistor $RV_1$ arranged to delay the reversion from the unstable to the stable conditions. The circuit including transistors TR9 and TR10 is connected with the mono-stable circuit through a resistance divider circuit $R_{24}$, $R_{25}$ with a tap between the resistors connected to the base of the transistor TR9.

The stepping pulses of the first stepping line SL1 are applied to the base of the transistor TR7 to cause the normally prevailing non-conducting condition of this transistor to be changed. Hence, the mono-stable circuit assumes its unstable condition with the transistor TR8 non-conducting, and the transistor TR9, driven by the transistor TR8, accordingly becomes conducting. After the delay determined primarily by the combination of capacitor $C_D$ and variable resistor $RV_1$, the mono-stable circuit reverts to its stable condition and at this instant the transistor TR9 becomes non-conducting again with the same effect as is produced in these circumstances in the first portion of the pulse circuit. The delay is so arranged that the resultant pulses over the stepping line SL2 intervene midway in time between consecutive pulses over the line SL1, the possibility of adjustment which is provided at the variable resistor $RV_1$, enabling the mono-stable circuit to be so arranged.

It may be convenient for the output supplied by the stepping generator to the transmitter and filter combination for transmission to the outlying counting chain to be of opposite phase to that supplied directly to the pulse circuit of the office counting chain. In such a case, the receiver and filter combination at the field location may be arranged to produce a negative potential only in the absence of the carrier frequency $f_5$ over the line circuit. In this way the phase shift introduced at the stepping generator is corrected at the receiver and filter combination so that the stepping pulses over corresponding stepping lines at the control office and the field location are synchronised.

There will now be described the equipment which is associated with the counting chain at the control office. First of all, a manually operable two-position control device, such as a simple switch CD1 as is shown diagrammatically associated with the 1st stage in FIG. 1, is associated with each of those stages of the office counting chain which corresponds to an item of apparatus in the outlying area whose position is controllable from the control office. It is required that the position of an item of controllable apparatus be changed as a result of the position of the associated control device being changed, and towards this end the function of the control devices is to determine which of two paths is taken by an output pulse which is obtained from the respectively associated stages as a result of their conditions being reversed. Depending on the path taken by the output pulse, a selector (FIG. 1) causes one or other of two transmitters to transmit over the line circuit one or other of two respective carrier frequencies which serve as first and second outgoing control codes, designated herein $f_1$ and $f_2$, characteristic of the prevailing position of the control device being scanned. It is by the pulses obtained from the associated stages that the scanning of the control device positions is performed and these pulses will therefore be referred to simply, for convenience, as scanning pulses. At the station (FIG. 1a), a similar operation occurs. Indication relay contacts such as CDA1 determine the path taken by an output pulse obtained from the respective station counting chain stages. The selector then actuates one or the other of two station transmitters to transmit a pulse of carrier current of frequency $f_3$ or $f_4$, which serve as incoming indication codes characteristic of the existing condition of the function or indication relay being scanned.

Figure 5:
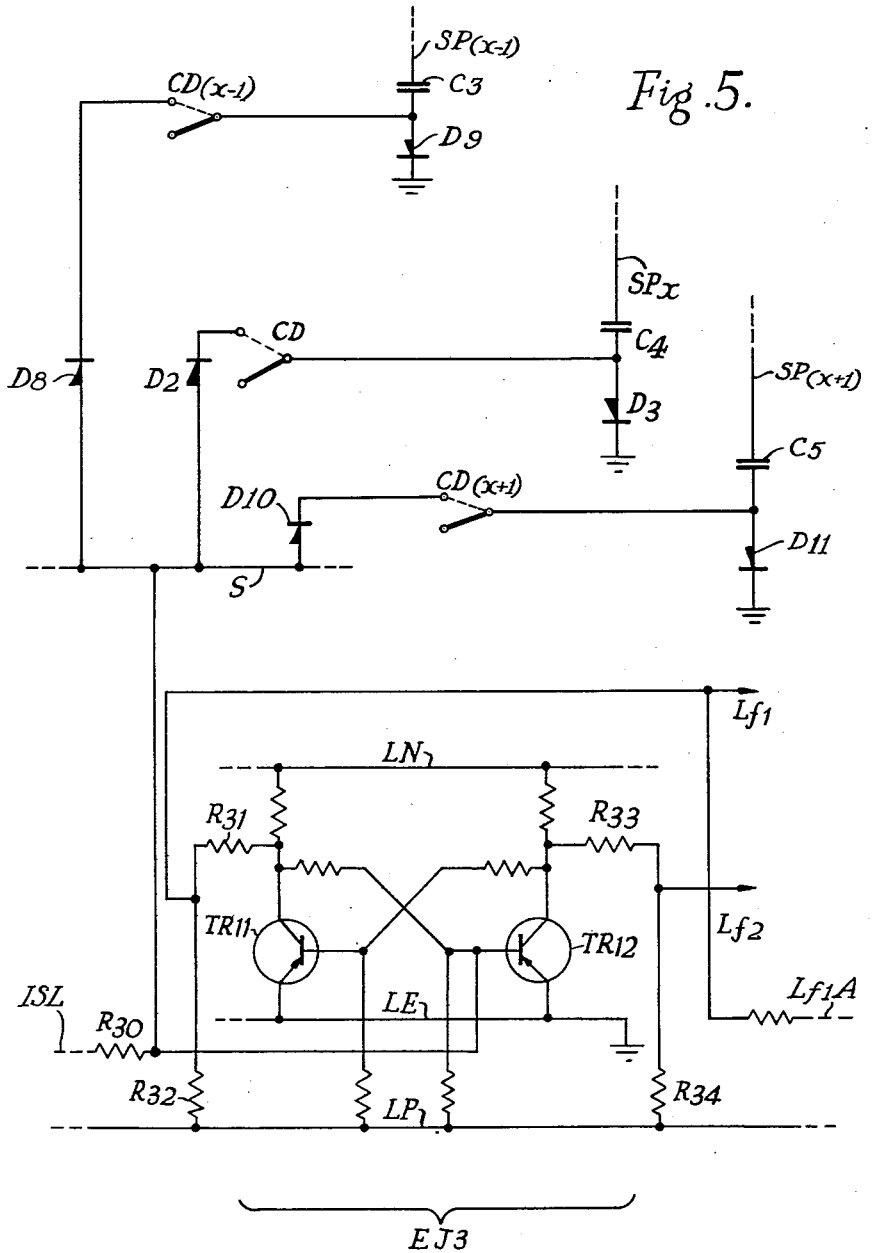
FIG. 5 is a circuit diagram of a transmitter selector circuit.

To describe in more detail the circuitry, including the selector, between the counting chain stages and the transmitters, reference will now be made to FIG. 5. For each of the stages having an associated control device, a line SP connected to the collector of the transistor TR2 of the main EJ circuit of the stage (see FIG. 2) is connected through the associated control device CD to a common selector line S. In FIG. 5 are seen the SP lines for the stages numbered $(x-1)$, $x$, and $(x+1)$, the respective lines being differentiated by the addition of the stage number as a suffix. The components associated with each of these lines are the same. For example, shown in line SP are a half-wave rectifier $D_2$ poled to prevent the intrusion into the line of negative pulses from the common selector line S, the control device CD, a capacitor $C_4$, and a shunt path to ground, connected between the control device and the capacitor and including a half-wave rectifier $D_3$ poled to allow the dissipation of positive pulses to ground. Associated with line $SP_{(x-1)}$ to provide a connection to line S are rectifier $D_8$, control device $CD_{(x-1)}$, and capacitor $C_3$, while rectifier $D_9$ provides a shunt path to ground. The similar components for line $SP_{(x+1)}$ are rectifier $D_{10}$, device $CD_{(x+1)}$, and capacitor $C_5$, with rectifier $D_{11}$ constituting the ground shunt path.

The provision of a selector line common to all stages enables the use of only a single selector circuit. The basis of this selector circuit is an Eccles-Jordan bistable circuit EJ3 of the same configuration as those previously described with reference to the composition of the counting chain stages, the transistors being here designated TR11 and TR12. Connected in parallel to the base of the transistor TR12 are, on the one hand, the selector line S, and, on the other hand, a pulse line ISL. In the form herein described, brief pulses of positive potential are supplied over line ISL through a resistor $R_{30}$ at the same frequency as, and in synchronism with, the stepping pulses over the first stepping line SL1, these positive pulses being conveniently produced by inverting the first stepping pulses in any known manner. Connected between the collector of the transistor TR11 and the line LP at steady positive potential is a resistance divider circuit $R_{31}$, $R_{32}$. Likewise disposed in respect to transistor TR12 is a similar divider circuit $R_{33}$, $R_{34}$. From tapping points between the resistors of these circuits are taken respectively lines $Lf_1$ and $Lf_2$ leading to the transmitters.

It will be recalled from earlier description that, when the condition of the main EJ circuit of a stage is reversed, the transistor TR2 of that circuit changes over from a conducting to a non-conducting condition. As a consequence of this change-over, considering stage X, a negative scanning pulse is produced by the capacitor $C_4$ connected over line $SP_x$ to the collector of that transistor. Should the control device $CD_x$ be in that one of its two positions in which it completes the circuit from line $SP_x$, this negative scanning pulse is conducted to the selector line S. The dissipation of the scanning pulse to the inactive capacitors, such as $C_3$ and $C_5$, included in the other SP lines is prevented by the provision of a rectifier, such as rectifiers $D_8$ and $D_{10}$, in each of these other lines and the pulse therefore becomes superimposed on the positive pulses supplied over the line ISL.

The negative scanning pulse is contemporaneous with a positive pulse, since both originate from the stepping supply over the first stepping line, and the amplitude of the scanning pulse exceeds in the opposite sense the amplitude of the positive pulse to such an extent as to ensure that a negative potential is impressed on the base of the transistor TR12. Thus, if this transistor were previously not conducting, its condition will now be changed. At all events, in response to the reception of the negative scanning pulse in the selector circuit, a negative potential is supplied over the line $Lf_1$ since the transistor TR11 of necessity becomes non-conducting. Also, since transistor TR12 is in the conducting condition, no such negative potential is supplied over the line $Lf_2$.

The selector circuit being bi-stable, the condition in which negative potential is supplied over the line $Lf_1$ only persists until a stage is reached in the course of scanning when the scanning pulse is withheld from the selector circuit. Supposing that for the next stage $(x+1)$ the control device $CD_{(x+1)}$ is in the position to interrupt the circuit from line $SP_{(x+1)}$ so that the scanning pulse is not conducted to the selector circuit, the positive pulse over the line ISL, which coincides in time with this particular scanning pulse, then suffices in the absence of opposition by the scanning pulse to cause a positive potential at the base of transistor TR12. With transistor TR12 caused to become non-conducting in this way, the condition of the selector circuit is changed to its other stable condition and consequently negative potential is supplied over line $Lf_2$, but not $Lf_1$. The previous condition of negative potential supplied over line $Lf_1$ will therefore have lasted only for the duration of one step, that is to say, for the interval between reversal of the conditions of the main EJ circuits of two consecutive stages. Should the line $SP_{(x+1)}$ not have been interrupted, this condition would of course prevail for as many steps as negative scanning pulses are conducted to the selector circuit, that is to say, for as many of the following stages for which the associated control devices are positioned to complete their SP lines.

The shunt paths to ground connected to the SP lines serve to dissipate rapidly the positive pulses produced by the capacitors C when the transistors TR2 are changed to the conducting condition on resetting of the counting chain so that these capacitors may be divested of positive charge in readiness for the next scanning cycle.

It will be appreciated that the arrangement of the selector circuit just described is subject to externally imposed control. The control may be made in some measure inherent in the selector circuit itself if, as an alternative, this circuit is arranged to be mono-stable instead of bi-stable and means similar to those of the mono-stable circuit of FIG. 4 (transistors TR7, TR8, etc.) are included to delay the reversion of the circuit from the unstable to the stable conditions by a period which ensures that the unstable condition, when once it has been brought about, prevails for the duration of a counting step. The supply of positive pulses over the line ISL is unnecessary in this case and the negative pulses alone are utilized, when permitted to pass to the selector circuit, to change the mono-stable circuit to the unstable condition.

The transmitters for the outgoing control codes $f_1$ and $f_2$ are, as shown in FIG. 1, connected to the line circuit LC through appropriate band pass filters and are arranged to transmit their respective codes only on being energized with negative potential over the line $Lf_1$ or $Lf_2$, respectively. Thus, through the intermediary of the selector circuit and the transmitters, the line circuit LC is conditioned in accordance with the positions of the control devices by the transmission of codes characteristic of those positions.

The apparatus at the station to control the transmission of indications is similar to that just described at the office. The station selector circuit arrangement is identical in form and operation to that of FIG. 5 except for the substitution of an indication relay contact, illustrated in FIG. 1a by contact CDA1, in place of the control device CD. Depending upon the existing position or condition of the corresponding function, the indication relay contact passes or blocks the scanning pulse from the associated counting stage to actuate the selector circuit to apply a negative potential over line $Lf_3$ or $Lf_4$, respectively (FIG. 1a). The transmitters $f_3$ and $f_4$ for the indication codes transmit the respective code, i.e., a pulse of carrier current of that frequency, only on being energized by a negative potential over line $Lf_3$ or $Lf_4$, respectively. Each transmitter is connected to line circuit LC through an appropriate band pass filter (FIG. 1a).

Figure 6:
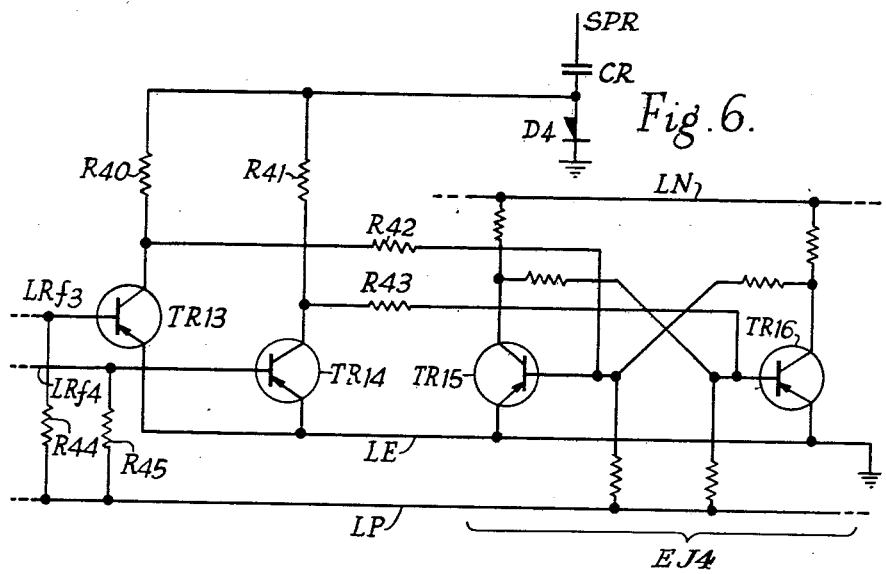
FIG. 6 is a circuit diagram of a registry stage.

There are furthermore provided at the control office so-called office registry stages associated respectively with all those stages which correspond with items of apparatus in the outlying area whose positions are to be indicated at the control office. Such a registry stage is shown in FIG. 6. For each of the stages having an associated registry stage, a line SPR connected to the collector of the transistor TR4 of the intermediate EJ circuit of the stage (see FIG. 2) is connected through a capacitor $C_R$ to two parallel gating circuits, each of a two-stage type, constituted by transistors TR13 and TR14, the connections to the collectors of these transistors including resistors $R_{40}$ and $R_{41}$, respectively. A shunt path to ground is connected intermediate the capacitor and the parallel gating circuits and includes a half-wave rectifier $D_4$ poled to allow the dissipation of positive pulses to ground. Between resistors $R_{40}$ and $R_{41}$ and the collectors of the respective transistors, taps are taken through resistors $R_{42}$ and $R_{43}$ to the bases of the two transistors TR15 and TR16 of an Eccles-Jordan circuit EJ4. The emitters of the transistors TR13 and TR14 are connected to the line LE at ground potential while the bases are connected through resistors $R_{44}$ and $R_{45}$, respectively, to the line LP at steady positive potential. The bases are also connected by separate receiver lines $LRf_3$ and $LRf_4$, respectively, to separate sources of negative potential, the nature of which will be described shortly. It suffices for an immediate understanding of the registry stages to state that, during a single scanning step, there is supplied over one or the other, but not both, of the lines $LRf_3$ and $LRf_4$ a negative potential exceeding in the opposite sense the positive potential appearing at the bases of the transistors TR13 and TR14 from the line LP. Thus one or other of these bases is at negative potential while the other remains at positive potential, and hence one of the transistors is conducting while the other is non-conducting.

It will be recalled from earlier description that, when the condition of the intermediate EJ circuit of a counting stage is reversed, the transistor TR4 of that circuit changes over from a conducting to a non-conducting condition. Consequently a negative scanning pulse is produced by the capacitor $C_R$ connected to the collector of that transistor in just the same way as a moment previously a similar scanning pulse was produced by the reversal of the main EJ circuit. The negative pulse appearing at the collector of that one of the gating transistors TR13 and TR14 which is conducting at the time is conducted to ground at line LE, but the negative pulse appearing at the other, presently non-conducting gating transistor is conducted through resistor $R_{42}$ or $R_{43}$, as the case may be, to the base of one of the transistors TR15 and TR16. Thus, it will be evident from FIG. 6 that, with negative potential supplied over the line $LRf_3$, the negative scanning pulse produced by the capacitor $C_R$ will cause the circuit EJ4 to change over into the condition in which transistor TR15 is non-conducting and transistor TR16 conducting, if the circuit is not already in this condition. With negative potential supplied over the line $LRf_4$, the scanning pulse causes the circuit to change to the opposite condition in which transistor TR15 is conducting and transistor TR16 is non-conducting, again if the circuit is not already in this condition. Hence the condition of the circuit EJ4 depends upon the emission of a scanning pulse by its associated counting stage and upon which one of the two lines $LRf_3$ and $LRf_4$ is energized at the time of the emission.

Figure 7:
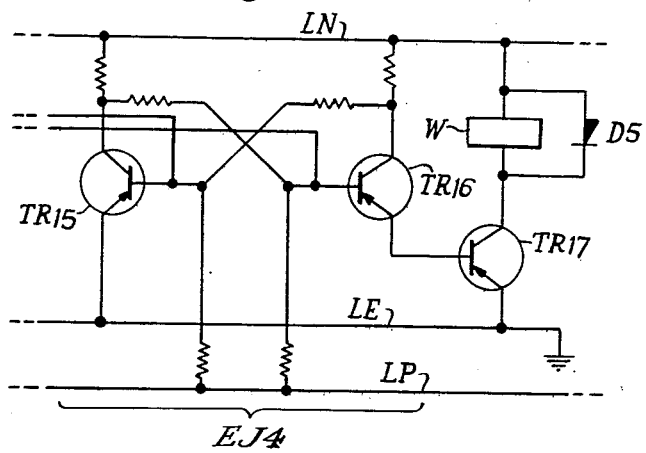
FIG. 7 shows, by means of a circuit diagram, how the registry stage may be extended to operate an electromagnetic relay.

It is usually the case that the operation of an electromagnetic relay is to be controlled in accordance with the state of each registry stage. For this purpose, the registry circuit is extended as shown in FIG. 7 from which it is seen that the emitter of the transistor TR16 is connected to the base of a further transistor TR17, the collector to emitter current of the former thereby serving as the base input for the latter. The winding W of the relay is interposed between the collector of the transistor TR17 and the line LN at steady negative potential and has a shunt path including a half-wave rectifier $D_5$.

When the state of the registry circuit is such that transistor TR15 is conducting and perforce transistor TR16 is non-conducting, negligible current flows through the latter and hence to the base of the transistor TR17. Transistor TR17 is therefore non-conducting and the winding W of the relay is not energized.

When the opposite state of the registry circuit occurs, transistor TR16, which is then conducting, passes appreciable current to the base of transistor TR17, thereby causing it to conduct. Accordingly the winding W of the relay is energized. It will be noted that such energization becomes possible only when the negative potential is supplied over the line $LRf_3$.

The rectifier $D_5$ is poled in the shunt path to act as a surge absorber for the energy in the relay winding when the relay is de-energized.

We shall now review the equipment which is associated with the counting chain at the field location since the provision is made there of counterparts of the control devices and the office registry stages. Thus, so-called function indication relays (see FIG. 1a) are the counterparts of the control devices and are provided for each item of apparatus whose position is to be indicated at the control office. They are representative, according to which of their two positions they occupy, of the prevailing positions of the respective items of apparatus, and their positions are arranged to be scanned by scanning pulses emitted from the stages of the outlying counting chain in the same way that the control devices are scanned. Moreover, the paths taken by the scanning pulses as determined by the function indicating relays in turn determine through the intermediary of a selector which of two transmitters is caused to transmit over the line circuit for any particular counting step. The carrier frequencies which these transmitters are effective to transmit serve as first and second incoming indication codes designated herein $f_3$ and $f_4$, the one or the other being transmitted to condition the line circuit in accordance with the position of the function indication relay being scanned at the time.

The transmitters are combined with appropriate band pass filters in the same way as the transmitters for the outgoing control codes $f_1$ and $f_2$. It may be mentioned at this point that each of these codes, as also the carrier frequency $f_5$ used for stepping purposes, is of a different frequency from the others so as to permit simultaneous transmission over a single communication channel, which may be, as herein considered, a pair of line wires constituting the line circuit.

Field registry stages which are the counterparts of the office registry stages are also provided at the field location, but only for each item of apparatus whose position is controllable from the control office. They are arranged similarly to the office registry stages, but the respective relays controlled thereby in turn control the positions of the controllable apparatus so that these positions are determined automatically in accordance with the prevailing states of the respective registry stages.

Receivers and appropriate filters connected to the line circuit are receptive respectively to the carrier frequency codes, those receptive to codes $f_1$ and $f_2$ being located at the field location and those receptive to codes $f_3$ and $f_4$ being located at the control office. Only in response to the absence over the line circuit of the carrier current or code to which it is receptive, does each receiver supply an output, this being in the form of a steady negative potential which is used to control the gating circuits of the associated registry stages. At the office, as previously stated, the output of the receiver for carrier code $f_3$ is connected to line $LRf_3$ and the output of the receiver for frequency $f_4$ to line $LRf_4$. At the station, the output of the receiver for frequency $f_1$ is connected to the line $LRf_1$, the equivalent of line $LRf_3$ and the output of the receiver for carrier code $f_2$ to the line $LRf_2$, the equivalent of line $LRf_4$.

On the basis of the foregoing description it will now be convenient to consider the mode of operation of the complete system. The two counting chains, the one at the control office and the other at the field location, are stepped synchronously by the simultaneous application of the two supplies of stepping pulses derived in common from the stepping generator. In each chain, the reversed condition is advanced from one stage to the next by the successive reversal of the main and intermediate EJ circuits of a single stage. As the stages are reversed in sequence, scanning pulses are emitted and these pulses effectively scan, at the office, the positions of the control devices and the states of the office registry stages and, at the field location, the positions of the function indication relays and the condition of the field registry stages.

The operations which take place during the first three steps of a scanning cycle will now be examined for an assumed set of circumstances, the initial assumption that the first three stages serve both for controlling and indicating. In order that the particular set of circumstances which has been chosen may be more simply stated, it may be explained here that the position of each of the control devices in which it interrupts its SP line corresponds to that one of the two positions of the item of apparatus which is the more restrictive on the movement of railway traffic. This particular position of the control device is, therefore, referred to as the "on" position, the corresponding position of the item of apparatus being likewise referred to. Accordingly, the other position is referred to in each case as the "off" position. It will be assumed that in the first stages of the counting chains the control device is set "on" and the item of apparatus is also set "on", that in the second stages the control device is set "on" and the item of apparatus is set "off," and that for the third stages the control device is set "off" and the item of apparatus is set "on."

When, at the commencement of the first step of the scanning cycle, the main EJ circuit of the first stage of the office counting chain is reversed, a negative scanning pulse is emitted from the collector of the transistor TR2 over line SP (FIG. 2), but since the control device is "on," i.e., switch CD open (FIG. 5), the scanning pulse does not reach the selector circuit. In the absence of the scanning pulse in the selector circuit, a negative potential is applied over the line $Lf_2$ to the transmitter for carrier code $f_2$. Thus a code pulse of frequency $f_2$ is transmitted over the line circuit for the duration of the first step. At the same time as the main EJ circuit of the first stage of the office counting chain is reversed, the corresponding circuit of the outlying counting chain is reversed. The scanning pulse emitted thereby also does not reach the selector circuit at the field location since the item of apparatus associated with the first stage is "on" and consequently the associated function indication relay contact, such as contact CDA1 shown in FIG. 1a, interrupts the line SP to the selector circuit. In the absence of the negative scanning pulse in the selector circuit, a negative potential is applied over line $Lf_4$ to cause the transmitter for carrier code $f_4$ to transmit over the line circuit for the duration of the first step.

Midway in time in the course of this first step, the intermediate EJ circuits of the first stages of the two chains are reversed, and on reversal negative scanning pulses are applied to the associated registry stages from the collector of transistors TR4 over line SPR (FIG. 2). Considering first of all the office registry stage (FIG. 6), since carrier code $f_4$ prevails in the line circuit, the receiver $f_3$ supplies a negative potential over the line $LRf_3$ to the transistor TR13 acting as one of the parallel gating circuits. The circuit EJ4 therefore assumes, under the influence of the negative pulse passed to it from capacitor CR by the transistor TR14, the condition in which transistor TR16 is conducting, this circuit being effective in this condition to give an "on" indication at the control office for the corresponding item of apparatus. Referring to FIG. 7, with transistor TR16 conducting, transistor TR17 is also caused to conduct and winding W of the relay is energized. Considering the field registry stage, the code $f_2$ which prevails over the line circuit results in the receiver $f_1$ applying a negative potential over the line $LRf_1$, equivalent to $LRf_3$ in FIG. 6, to one of the parallel gating circuits so that the registry circuit is maintained in the condition corresponding to the "on" position of the item of apparatus, that is, with transistors TR16 and TR17 conducting. Hence no change is brought about in the position of this item of apparatus.

When, at the commencement of the second step of the scanning cycle, the main EJ circuit of the second stage of the office counting chain is reversed, the negative scanning pulse emitted thereby again does not reach the selector circuit since the control device for that stage is also "on." Thus the carrier code $f_2$ continues to be transmitted without interruption over the line circuit. Since the item of apparatus associated with the second stages is "off," the corresponding function indication relay contact completes the line SP to the station selector circuit. Thus the scanning pulse emitted at this time by the main EJ circuit of the second stage of the outlying chain does reach the selector circuit, with the result that the transmitter for carrier code $f_3$ is caused to transmit over the line circuit for the duration of the second step.

Midway in time in the course of this second step the registry stages become responsive as before to the codes prevailing over the line circuit. Considering first of all the office registry stage, the code $f_3$ which prevails in the line circuit causes the circuit EJ4 of the stage to reverse to the condition in which transistor TR15 is conducting and transistor TR16 is non-conducting. This circuit is effective in this condition to give the "off" indication at the control office, with winding W of the associated relay deenergized, for the corresponding item of apparatus at the station. Regarding the field registry stage, its circuit EJ4 was previously in the condition corresponding to the "off" position of the item of apparatus. However, with code $f_2$ now prevailing over the line its condition is changed over so that transistors TR16 and TR17 are conducting and accordingly the respective item of apparatus undergoes a change to the more restrictive "on" position.

Two points arise from the operations resulting from the second stage scanning. Firstly, although in the office registry stages the gate transistor TR14 becomes conducting instead of TR13, as was the case during the first step, any other of the office registry stages, apart from the second, are unaffected by this change since only in the second stage is the further requisite of a scanning pulse available. Secondly, the new position taken up by the item of apparatus is not immediately indicated at the control office, unless the indication is arranged to be given by a subsequent stage in the same cycle, but is deferred until the next scanning cycle. The delay in indicating a new position is hardly significant when the operating rate is of the order, say, of 50 steps per second.

At the commencement of the third step of the scanning cycle, the negative scanning pulse emitted from the main EJ circuit of the third stage of the office counting chain passes over the control device in the "off" or closed position to the selector circuit. Thus, for the duration of the third step the carrier code $f_1$ is transmitted over the line circuit. As in the case of the first step, the third stage of the outlying counting chain causes the transmitter $f_4$ to transmit over the line circuit for the duration of the step.

When, midway in time in the course of this third step, the registry stages become responsive to the codes prevailing over the line circuit, there is again disconformity as between the "off" position of the control device, as characterized by code $f_1$, and the "on" position of the item of apparatus. Hence, the circuit EJ4 of the third field registry stage is changed over, so that transistor TR15 becomes conducting, and accordingly the item of apparatus undergoes a change to the less restrictive "off" position.

The cycle continues step by step, ensuring that conformity is maintained, on the one hand, between the positions of the control devices and the field registry stages, and on the other hand, between the office registry stages and the function indication relays, until the cycle is completed with the reversal of the EJ circuits of the last stages numbered $n$ in each chain.

Figure 8:
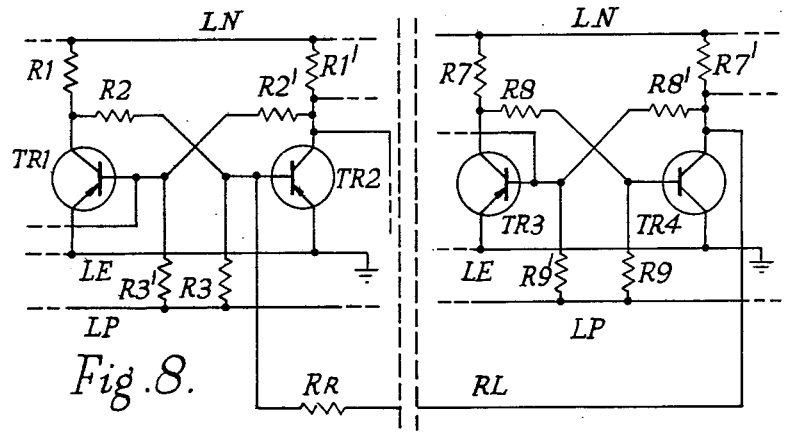
FIG. 8 shows, by means of a circuit diagram, parts of the office counting chain which operate to reset the office chain.

It will be recalled that to initiate resetting of the counting chains, a negative pulse has to be applied to the base of the transistor TR2 of the first stages (FIG. 2). In the case of the office counting chain this is obtained from the collector of the transistor TR4 of the intermediate circuit EJ2 of the last stage of the office chain. As this circuit is reversed, approximately full negative potential appears at the collector of transistor TR4 and this potential is conducted for resetting purposes over the line RL including resistor $R_R$, as seen in FIG. 8.

Figure 9:
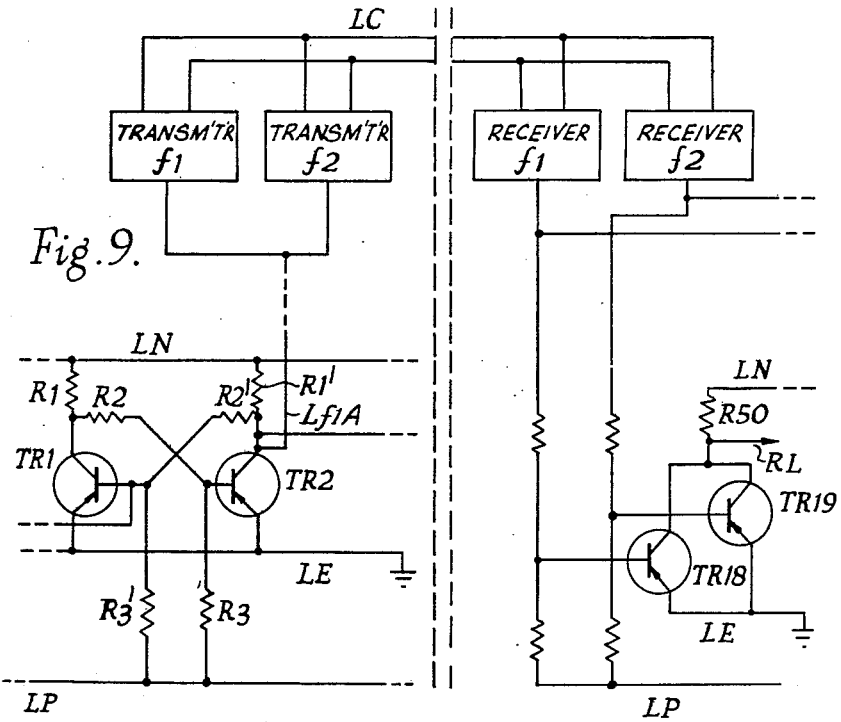
FIG. 9 shows, again by circuit diagram, parts of the office and outlying counting chains which operate to reset the outlying chain.

In the case of the outlying chain, the resetting potential is preferably also derived from the last stage of the office chain so as to synchronize the resetting operations. For this purpose, the arrangement schematically shown in FIG. 9 is used. An output is taken from the collector of the transistor TR2 of the circuit EJ1 of the last office stage through a line $Lf_1A$ so that both carrier transmitters $f_1$ and $f_2$ are simultaneously actuated. As was previously explained in connection with FIG. 5, when no scanning pulse is received by the selector from circuit EJ2 of an active counting stage, transistor TR12 remains or becomes non-conducting. A negative potential is then supplied over line $Lf_2$ to actuate transmitter $f_2$. Since no control function is assigned to the last stage, carrier current of frequency $f_2$ is obviously transmitted during this scanning step. In addition, the negative potential from transistor TR2 of the last stage (FIG. 9) is carried over line $Lf_1A$ and thence over line $Lf_1$ (FIG. 5) to also actuate transmitter $f_1$. Thus, when the condition of the last office stage is reversed, the unique condition is created of both carrier codes $f_1$ and $f_2$ being present over the line circuit during the same step. Responsive to this unique condition is an "AND" circuit at the field location, this circuit comprising two transistors TR18 and TR19 having their respective collector to emitter circuits connected in parallel between a resistor $R_{50}$, which is otherwise connected to line LN at steady negative potential, and line LE at ground potential. The bases of the transistors are connected to intermediate taps in separate resistance divider networks connected between line LP and, respectively, receivers $f_1$ and $f_2$. The reset line RL for the outlying chain is connected to the transistor side of the resistor $R_{50}$.

It will be recalled that the output from each receiver is approximately full negative potential when current of its particular frequency is not being received, falling to approximately zero potential on reception of the frequency. So long as there is only one of the frequencies $f_1$ and $f_2$ present over the line circuit, there will be a negative potential applied to the base of one of the transistors TR18 and TR19 by the receiver which is not activated at the time, and this transistor will therefore be conducting. Consequently, current flows through resistor $R_{50}$ and the reset line RL is held at approximately zero potential.

However, on the final step of the scanning cycle, when both receivers are activated, neither of the bases of the transistors has negative potential applied to it so that both transistors become non-conducting. Consequently no appreciable current can flow through resistor $R_{50}$ and the potential of the station reset line RL shifts to substantially full negative potential, at the same time as it does in the corresponding line of the office chain.

For very long counting chains, the reset line may be connected with one or more other stages in the chain so that resetting may be initiated simultaneously at a plurality of points in the chain to reduce the resetting time.

It will be appreciated that, with the arrangement of FIG. 9, the last stages of the chains cannot serve for the transmission of orders since the two outgoing control codes are being otherwise employed. It is therefore convenient for the last stages to function solely for resetting purposes. However, in FIGS. 1 and 1a, the last stages n are shown to serve also for the transmission of information, the desire being to illustrate that not every stage need be adapted for both control and indication. Thus, a track circuit, for instance, in the outlying area is not in need of control from the control office but is only required to provide an indication there. The stages corresponding to the track circuit would therefore be adapted solely for indication. The penultimate stages (n−1) are also shown to be so adapted for the sake of example.

An alternative way of synchronizing the resetting operations is to introduce a brief break in the stepping supply driving the counting chains or some other transmitted frequency or frequencies. This break, representing a condition of the line circuit which is detectable both at the control office and the field location, provides a distinctive signal for synchronizing purposes.

The distinctive signal obtainable at the station from the two-frequency carrier code received from the office may be further utilized to check that the scanning at the control office and at the field location is synchronized. For this purpose, the signal, which is assumed to take the form of a pulse of negative potential as does the signal applied to the reset line in FIG. 9, is fed to a circuit which relies on a similar pulse being fed to it at the same time from the last stage of the outlying counting chain to maintain a relay energized. Such a circuit is shown in FIG. 10 and comprises an AND circuit A1 and a monostable circuit M1. Included in the circuit A1 are two transistors TR20 and TR21 to the bases of which are taken respectively a connection RLA from the reset line RL at the field location (FIG. 9) and a connection $SP_n$ from the collector of the transistor TR2 of the last stage of the outlying chain (FIG. 2). Since the pulse of negative potential over the reset line is derived from the corresponding transistor collector of the office chain, as shown in FIG. 9, it should be contemporaneous, at least in part, with the pulse from the outlying chain if synchronism exists. The emitter to collector circuits of transistors TR20 and TR21 are connected in series, together with a common collector resistor $R_{51}$, between ground line LE and negative potential line LN. Obviously, current flows in this series circuit only when negative pulses are applied simultaneously over lines RLA and $SP_n$ to the bases of transistors TR20 and TR21, respectively. This condition occurs during the last step of each scanning cycle only when synchronism exists between office and field chains. The approximately full negative potential which normally exists at the collector of transistor TR20 is applied to the base of pulse inverter transistor TR24 to maintain this unit normally conducting. When transistors TR20 and TR21 both conduct, the collector of transistor TR20 shifts to a zero potential which is applied to the base of transistor TR24 to cause it to become non-conducting and the potential at its collector to shift to a nearly full negative value.

The circuit M1 includes two transistors TR25 and TR26 and associated resistors connected in the usual Eccles-Jordan configuration with the exception of the addition of resistor $R_{53}$ and capacitor $C_x$ to create monostable operation, similar to that described for transistors TR7 and TR8 of FIG. 4. Normally, in the stable condition, transistor TR25 is conducting and transistor TR26 non-conducting. The negative pulse applied from the collector of transistor TR24 to the base of transistor TR26, when negative pulses occur simultaneously in lines RLA and $SP_n$, causes transistor TR26 to become conducting, thus shifting circuit M1 to its unstable condition. The circuit remains in this unstable condition until capacitor $C_x$ has discharged, and then reverts to its stable condition. The time constant associated with capacitor $C_x$, as established by resistor $R_{53}$, is preferably arranged such that the circuit remains in its unstable condition for approximately half the counting chain operating cycle, although this is not critical. Thus if the scanning actions are synchronized, the circuit M1 cycles once per scanning cycle, with about equal time in each condition.

The negative output from the collectors of transistors TR25 and TR26, when they are respectively non-conducting, is used to charge, through rectifiers D6 and D7, respectively, the reservoir capacitors $C_1$ and $C_2$. As long as the circuit M1 cycles through its two conditions during each scanning operation, capacitors $C_1$ and $C_2$ remain charged and provide negative potential to the bases of transistors TR22 and TR23, respectively, to hold these transistors in the conducting condition. The emitter to collector circuits of these transistors are connected in series with the winding OOS of a fault relay between lines LE and LN. With both transistors conducting, the relay winding is obviously energized.

Thus, if scanning is proceeding correctly and in synchronism, the reservoir capacitors are recharged during each scanning cycle, and the relay is consequently maintained energized. If it happens that synchronism does not pertain over a particular cycle, the input pulses to the circuit A1 do not coincide and the reservoir capacitors are not both recharged. Preferably the values of the capacitors are such that the transistors TR22 and TR23 may be maintained conducting in the absence of recharging for just one scanning cycle. In this way, de-energization of the relay is prevented in the event of an isolated incorrect scanning cycle. If, however, an out-of-synchronism scanning condition exists for longer than the period the reservoir capacitors hold their charge, one of transistors TR22 and TR23 becomes non-conducting and the winding OOS is deenergized. Release of the fault relay may be utilized to activate an alarm and also to control the supply of energy to the registry relays to return all functions to their safe position and thus eliminate any incorrect function registration.

The check circuit just described is at the field location. Should it be required at the control office, for instance, for the purpose of sounding an alarm, then both the incoming indication carrier codes $f_3$ and $f_4$ would be transmitted simultaneously from the field location at the completion of the scanning cycle there, and a similar check circuit would be provided at the control office to test for the coincidence of this transmission with the completion of the cycle at the control office.

It should be made clear that the system is an order and information device which is super-imposed on the normal signal system. The safety of train movements is maintained by the usual electrical interlocking circuits between track circuits, switches, and signals.

Although we have herein shown and described specifically but one form of a continuously scanning remote control system embodying the features of our invention, it is to be understood that various modifications and changes may be made therein within the scope of the accompanying claims without departing from the spirit and scope of our invention.

Having now described the invention, what we claim as new and desired to secure by Letters Patent is:

1. In a continuously scanning remote control system in which the sequential scanning of the positions of movable devices at a first and a second location proceeds simultaneously and in step in continuously recurring cycles, said first and second locations being connected by a communication channel, the combination comprising, a counting chain at each location for controlling the step-by-step scanning and including a plurality of consecutively acting counting stages each consisting of a first and a second bi-stable circuit arrangement which reverse their conditions successively when the corresponding stage is counted, means at each location controlled by the first circuits of the associated counting stages when each such first circuit reverses condition for successively conditioning said communication channel in accordance with the position of the movable devices scanned by the corresponding counting chain, and other means at each location controlled successively by the second circuits of the associated counting stages when each such second circuit reverses condition for responding to the condition of said communication channel to register the positions of the movable devices scanned by the counting chain at the other location, the successive reversal of each pair of bi-stable circuits assuring that each conditioning of said communication channel is completed prior to the corresponding response thereto.

2. In a continuously scanning remote control system in which the sequential scanning of the positions of movable devices proceeds simultaneously and in step at all locations of the system, said locations being connected by a communication channel, the combination at a particular location of the system comprising, a counting chain comprising a plurality of consecutively acting counting stages for controlling the scanning action, each stage further comprising a first and a second bi-stable circuit which successively reverse their conditions when the associated stage is counted, transmitting means controlled successively by the first circuit of each stage and having connections for conditioning said communication channel when each first circuit reverses condition in accordance with the position of the corresponding movable device being scanned, and receiving means successively controlled by the second circuit of each stage for responding to the condition of said channel established in accordance with the scanning of the position of a movable device at another of said locations, the successive reversal of said first and said second circuits of each stage assuring that said communicating channel is fully conditioned by said other location prior to said receiving means becoming responsive thereto.

3. In a continuously scanning remote control system in which the sequential scanning of the positions of movable devices at a first and a second location proceeds simultaneously and in step in continuously recurring cycles, said first and second locations being connected by a communication channel, the combination comprising, a counting chain at each location for controlling the step-by-step scanning and including a plurality of consecutively acting counting stages each consisting of a first and a second bi-stable circuit arrangement, a master stepping supply, a pulse generating means at each location controlled by said master stepping supply and having connections for supplying separate counting pulses to said first and said second bi-stable circuits for reversing the conditions thereof, said separate counting pulses having a time spaced relationship such that each pair of bi-stable circuits reverse conditions successively, means at each location controlled by the first circuits of the associated counting stages when each such first circuit reverses condition for successively conditioning said communication channel in accordance with the position of the movable devices scanned by the corresponding counting chain, and other means at each location controlled successively by the second circuits of the associated counting stages when each such second circuit reverses condition for responding to the condition of said communication channel to register the positions of the movable devices scanned by the counting chain at the other location, the successive reversal of each pair of bi-stable circuits assuring that each conditioning of said communication channel is completed prior to the corresponding response thereto.

4. In a continuously scanning remote control system in which the sequential scanning of the positions of movable devices at a first and a second location proceeds simultaneously and in step in continuously recurring cycles, said first and second locations being connected by a communication channel, the combination comprising, a counting chain at each location for controlling the step-by-step scanning and including a plurality of consecutively acting counting stages each consisting of a first and a second bi-stable circuit arrangement, a master stepping means for generating a continuous series of successive stepping cycles, a first and a second pulse generating means at each location, said first pulse generating means being controlled by said master stepping means and having connections for supplying counting pulses to said first circuit of each stage for successively reversing the conditions thereof, circuit means also responsive to the output pulses of said first pulse generating means for generating a series of secondary stepping pulses each displaced a predetermined time interval after the corresponding controlling pulse from said first generating means, said second pulse generating means being responsive to said secondary stepping pulses and having connections for supplying counting pulses to the second circuit of each stage for successively reversing the conditions thereof, the successive reversal of circuit conditions thereby alternating between the first and second circuits of the consecutive counting stages, means at each location controlled by the first circuits of the associated counting stages when each such first circuit reverses condition for successively conditioning said communication channel in accordance with the position of the movable devices scanned by the corresponding counting chain, and other means at each location controlled successively by the second circuits of the associated counting stages when each such second circuit reverses condition for responding to the condition of said communication channel to register the positions of the movable devices scanned by the counting chain at the other location, the successive reversal of each pair of bi-stable circuits assuring that each conditioning of said communication channel is completed prior to the corresponding response thereto.

5. In a continuously scanning remote control system for controlling from a first location the conditions of a plurality of items of apparatus at a second location, comprising in combination, a communication channel extending between said first and second locations, a plurality of two position control devices at said first location one for each item of apparatus at said second location, a counting chain at each location including a plurality of consecutively acting stages one for each item of apparatus, each stage at said first location being adapted to emit at least one output pulse when actuated, each stage at said second location being adapted to emit when actuated an output pulse displaced at predetermined time interval after the output pulse from the corresponding stage at said first location, a stepping means having connections including said channel for simultaneously actuating in sequence the corresponding stages of said counting chains in recurring scanning cycles, a selector circuit means at said first location having a connection to each counting stage completed only when the corresponding control device occupies a selected one of its two positions, said selector means being controlled by the output pulse of a stage when the corresponding connection is complete and otherwise by said stepping means for sequentially operating between a first and a second condition respectively as each scanning cycle progresses, transmitter means at said first location controlled by said selector circuit means and having connections for selecting between a first and a second frequency condition in said channel in accordance with the condition of said selector circuit means, and a plurality of two state functional elements at said second location one for each item of apparatus, each element having connections to said channel and to the corresponding stage of the associated counting chain for operating to a selected one of its two states when the corresponding stage emits an output pulse in accordance with the existing frequency condition of said channel as determined by the corresponding control device, each element having other connections for controlling the corresponding item of apparatus in accordance with the operated state of that element.

6. A continuously scanning remote control system for controlling from a first location the conditions of a plurality of items of apparatus at a second location, comprising in combination, a communication channel extending between said first and second locations, a plurality of two-position control devices at said first location one for each item of apparatus at said second location, a counting chain at each location including a plurality of consecutively acting stages one for each item of apparatus, each stage being adapted to emit in succession a first and a second output pulse when actuated, a stepping means having connections including said channel for simultaneously actuating in sequence the corresponding stages of said counting chains in recurring scanning cycles; a selector circuit arrangement at said first location including a common selector line, a by-stable circuit, and a source of biasing pulses synchronized with the counting chain first output pulses; an output circuit path from each counting stage at said first location connected to said selector line and completed to pass the associated stage first output pulse only when the corresponding control device occupies a selected one of its two positions; said bi-stable circuit being connected to said selector line and to said biasing source to receive said biasing pulses and at times said first output pulses, said bi-stable circuit being responsive to the reception of the pulses to sequentially operate to a first and a second condition as both pulses are received or as only a biasing pulse is received respectively as the consecutive counting stages are actuated during a scanning cycle; transmitter means at said first location controlled by said bi-stable circuit and having connections for establishing a first and a second frequency condition for said channel in accordance with the operated condition of said bi-stable circuit, and a plurality of two state functional elements at said second location one for each item of apparatus, each element having connections to said channel and to the corresponding stage of the associated counting chain for operating to a selected one of its two states when the corresponding stage emits its second output pulse in accordance with the existing frequency condition of said channel as determined by the corresponding control device, each element having other connections for controlling the corresponding item of apparatus in accordance with the operated state of that element.

7. A continuously scanning remote control system for controlling from a first location the conditions of a plurality of items of apparatus at a second location, comprising in combination, a communication channel extending between said first and second locations, a plurality of two position control devices at said first location one for each item of apparatus at said second location, a counting chain at each location including a plurality of consecutively acting stages one for each item of apparatus, each stage at said first location being adapted to emit at least one output pulse when actuated, each stage at said second location being adapted to emit when actuated an output pulse displaced a predetermined time interval after the output pulse from the corresponding stage at said first location, a stepping means having connections including said channel for simultaneously actuating in sequence the corresponding stages of said counting chains in recurring scanning cycles, a selector circuit means at said first location having a connection to each counting stage completed only when the corresponding control device occupies a selected one of its two positions, said selector means being controlled by the output pulse of a stage when the corresponding connection is complete and otherwise by said stepping means for sequentially operating between a first and a second condition respectively as each scanning cycle progresses, transmitter means at said first location controlled by said selector circuit means and having connections for transmitting a first or a second carrier frequency over said channel in accordance with the condition of said selector circuit means, a plurality of two condition registry circuits at said second location one associated with each stage of the second location counting chain, and a two-path gating circuit for each registry stage, each gating circuit being connected between the associated registry circuit and counting stage and responsive to the carrier frequency being transmitted over said communication channel for establishing one of said two paths to pass the output pulse of said associated counting stage to said associated registry circuit, said associated registry circuit being responsive to said output pulse for operating to one of its two conditions selected in accordance with the established gating path, each registry circuit having other connections for controlling a preselected item of apparatus in accordance with its existing condition.

8. A continuously scanning remote control system for controlling from a first location the conditions of a plurality of items of two-condition apparatus at a second location, comprising in combination, a communication channel extending between said first and second locations, a plurality of two-position control devices at said first location one for each item of apparatus at said second location, a counting chain at each location including a plurality of consecutively acting stages one for each item of apparatus, each stage being adapted to emit in succession a first and a second output pulse when actuated, a stepping means having connections including said channel for simultaneously actuating in sequence the corresponding stages of said counting chains in recurring scanning cycles, a selector circuit means at said first location having a connection to each counting stage completed only when the corresponding control device occupies a selected one of its two positions, said selector means being controlled by the first output pulse of a stage when the corresponding connection is complete and otherwise by said stepping means for sequentially operating between a first and a second condition respectively as each scanning cycle progresses, transmitter means at said first location controlled by said selector circuit means and having connections for transmitting a first or a second carrier frequency over said channel in accordance with the first and second condition of said selector circuit means, and a registry circuit arrangement at said second location for each item of apparatus including a gating circuit, a bi-stable circuit, and a two-state registry element controlling the associated item of apparatus, each gating circuit having connections to the corresponding second location counting chain stage and being responsive to the first or second carrier frequency being transmitted over said communication channel for establishing a first or a second circuit path for the second output pulse from said corresponding counting stage to the associated bi-stable circuit, said associated bi-stable circuit being responsive to the second output pulse of said corresponding stage to operate to the one of its two conditions corresponding to the circuit path established for said pulse, said bi-stable circuit having connections for controlling the associated registry element to occupy a selected one of its two states in accordance with the existing condition of said bi-stable circuit.

9. In a continuously operating remote control system for simultaneously scanning the positions of movable devices at a first and a second location connected by a communication channel, the combination comprising, a counting chain at each location for controlling the step-by-step scanning and including a plurality of consecutively actuated stages, each stage comprising a first and a second bi-stable circuit which reverse their conditions successively when the corresponding stage is actuated in the counting cycle, selector means at each location controlled by the first circuits of the associated counting stages and by said movable devices for successively establishing when each first circuit reverses its condition a selected carrier frequency condition in said communication channel in accordance with the position of the corresponding movable device, and registry means at each location controlled by the second circuits of the associated counting stages and responsive to the channel frequency condition established by the selector means at the other location for registering the position of the corresponding movable device at the other location when each second circuit reverses its condition.

10. In a continuously operating remote control system for continuously scanning the positions of movable devices at all locations of the system, the locations being connected by a communication channel, at a particular location the combination comprising, a counting chain including a plurality of consecutively actuated stages for controlling the step-by-step scanning action, each stage comprising a first and a second bi-stable circuit which successively reverse their conditions as the stage is actuated in the counting cycle, a selector means successively controlled jointly by the first circuit of each counting chain stage and the corresponding movable device at said particular location and having connections for successively establishing when each first circuit reverses its condition a selected frequency condition in said communication channel in accordance with the position of the movable device corresponding to that stage, and a registry means successively controlled by the second circuit of each counting chain stage and responsive to the successive frequency conditions of said communication channel established by the selector means of at least one other location for successively registering the positions of the movable devices of at least said one other location when each associated second circuit reverses its condition.

References Cited in the file of this patent

UNITED STATES PATENTS

| | | |
|---|---|---|
| 2,584,739 | Rees et al. | Feb. 5, 1952 |
| 2,629,088 | Kendall | Feb. 17, 1953 |
| 2,794,179 | Sibley | May 28, 1957 |